(12) United States Patent
Wada et al.

(10) Patent No.: US 12,195,653 B2
(45) Date of Patent: Jan. 14, 2025

(54) SCINTILLATOR AND RADIATION DETECTOR

(71) Applicant: KABUSHIKI KAISHA TOSHIBA, Tokyo (JP)

(72) Inventors: Atsushi Wada, Kawasaki (JP); Isao Takasu, Setagaya (JP); Fumihiko Aiga, Kawasaki (JP); Kohei Nakayama, Kawasaki (JP); Yuko Nomura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 731 days.

(21) Appl. No.: 17/445,847

(22) Filed: Aug. 25, 2021

(65) Prior Publication Data

US 2022/0259491 A1 Aug. 18, 2022

(30) Foreign Application Priority Data

Feb. 18, 2021 (JP) .................. 2021-023956

(51) Int. Cl.
*C09K 11/06* (2006.01)
*G01T 1/20* (2006.01)
*G01T 1/203* (2006.01)

(52) U.S. Cl.
CPC ............ *C09K 11/06* (2013.01); *G01T 1/2014* (2013.01); *G01T 1/2033* (2013.01);
(Continued)

(58) Field of Classification Search
CPC ............ C09K 11/06; C09K 2211/1007; C09K 2211/1011; C09K 2211/1018; G01T 1/2014; G01T 1/2033
See application file for complete search history.

(56) References Cited

U.S. PATENT DOCUMENTS 9,321,957 B2    4/2016 Menge
2007/0075254 A1*    4/2007 Shoji .................. G01T 1/202
                                                    250/361 R
(Continued)

FOREIGN PATENT DOCUMENTS

JP          04204079 A    *    7/1992
JP          10-232284 A         9/1998
(Continued)

OTHER PUBLICATIONS

Hajagos, T. J., Garcia, E., Kishpaugh, D., & Pei, Q. (2019). Plastic scintillators based on thermally activated delayed fluorescence dyes. Nuclear Instruments and Methods in Physics Research Section A, 940, 185-198. https://doi.org/10.1016/j.nima.2019.05.095 (Year: 2019).*

(Continued)

*Primary Examiner* — John D Freeman
(74) *Attorney, Agent, or Firm* — Oblon, McClelland, Maier & Neustadt, L.L.P.

(57) ABSTRACT

According to one embodiment, a scintillator includes a first layer. The first layer includes a first organic substance capable of emitting light, and a second organic substance. The second organic substance includes at least one selected from the group consisting of a carbonyl group, phosphine oxide, and a sulfinyl group. The first layer emits light based on beta rays incident on the first layer. A period from a time of a maximum value of an intensity of the light until the intensity of the light drops to 1/2.72 of the maximum value is not less than 10 ns.

19 Claims, 10 Drawing Sheets

(52) U.S. Cl.
CPC ............... *C09K 2211/1007* (2013.01); *C09K 2211/1011* (2013.01); *C09K 2211/1018* (2013.01)

(56) References Cited

U.S. PATENT DOCUMENTS

| | | | |
|---|---|---|---|
| 2020/0203617 A1* | 6/2020 | Duan | H10K 85/626 |
| 2020/0408937 A1* | 12/2020 | Hamel | G01T 1/2042 |
| 2022/0140244 A1 | 5/2022 | Takasu et al. | |

FOREIGN PATENT DOCUMENTS

| | | |
|---|---|---|
| JP | 2009-242385 A | 10/2009 |
| JP | 2020-37523 A | 3/2020 |
| JP | 2020-201163 A | 12/2020 |

OTHER PUBLICATIONS

E. Montbarbon, F. Sguerra, G. H. V. Bertrand, S. Gaillard, J.-L. Renaud, R. B. Pansu, M. Hamel, (2017). Structural Variation of Carbazole Derivatives for Plastic Scintillation Applications. ChemPhotoChem, 1, 451. https://doi.org/10.1002/cptc.201700055 (Year: 2017).*

Na Lin, Juan Qiao, Lian Duan, Liduo Wang, and Yong Qiu. (2014). Molecular Understanding of the Chemical Stability of Organic Materials for OLEDs: A Comparative Study on Sulfonyl, Phosphine-Oxide, and Carbonyl-Containing Host Materials. The Journal of Physical Chemistry C, 118 (14), 7569-7578. (Year: 2014).*

* cited by examiner

SCINTILLATOR AND RADIATION DETECTOR

CROSS-REFERENCE TO RELATED APPLICATIONS

This application is based upon and claims the benefit of priority from Japanese Patent Application No. 2021-023956, filed on Feb. 18, 2021; the entire contents of which are incorporated herein by reference.

FIELD

Embodiments described herein relate generally to a scintillator and a radiation detector.

BACKGROUND

For example, a scintillator is used in a radiation detector. It is desirable to increase the efficiency of the scintillator.

DETAILED DESCRIPTION

According to one embodiment, a scintillator includes a first layer. The first layer includes a first organic substance capable of emitting light, and a second organic substance. The second organic substance includes at least one selected from the group consisting of a carbonyl group, phosphine oxide, and a sulfinyl group. The first layer emits light based on beta rays incident on the first layer. A period from a time of a maximum value of an intensity of the light until the intensity of the light drops to 1/2.72 of the maximum value is not less than 10 ns.

According to one embodiment, a radiation detector includes the scintillator described above, and a light detecting part configured to detect the light from the first layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
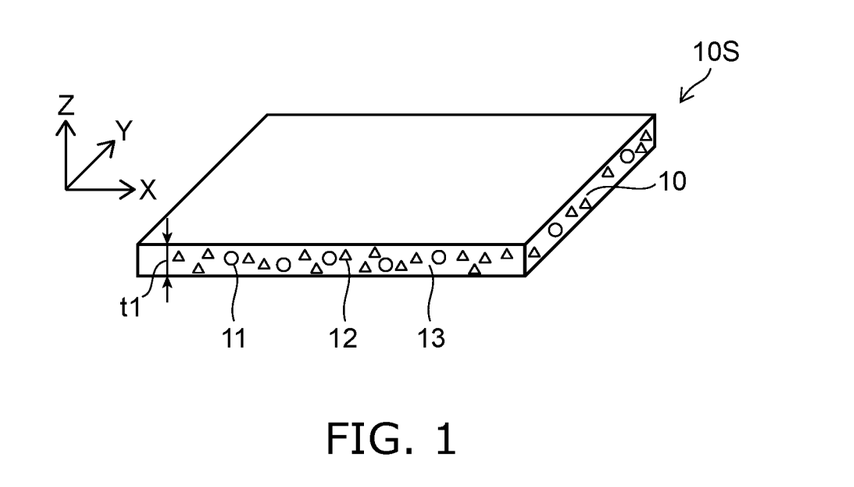
FIG. 1 is a schematic perspective view illustrating a scintillator according to a first embodiment.

FIG. 1 is a schematic perspective view illustrating a scintillator according to a first embodiment.

FIG. 2A, FIG. 2B, FIG. 3, and FIG. 4 are schematic views illustrating portions of the scintillator according to the first embodiment.

As shown in FIG. 1, the scintillator 10S according to the embodiment includes a first layer 10. The first layer 10 includes a first organic substance 11 and a second organic substance 12. The first layer 10 may include a third organic substance 13.

The first layer 10 is configured to emit light based on radiation (e.g., beta rays) incident on the first layer 10. For example, the first organic substance 11 can emit light. For example, light is emitted from the first organic substance 11 when radiation is incident on the first organic substance 11. In one example, the radiation is beta rays.

Figure 2A:
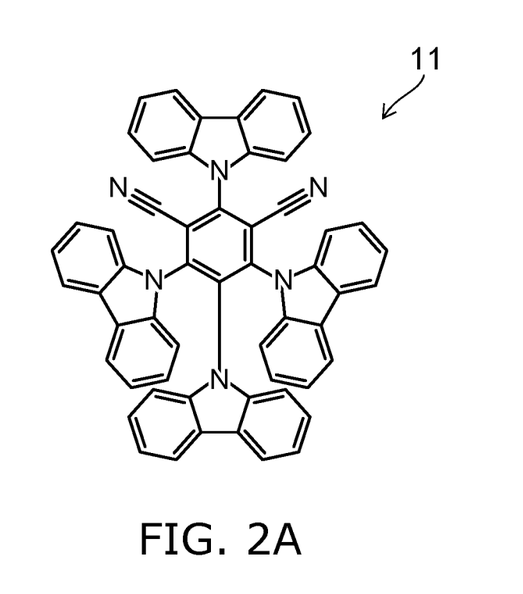
FIGS. 2A and 2B are schematic views illustrating portions of the scintillator according to the first embodiment.
Figure 2B:
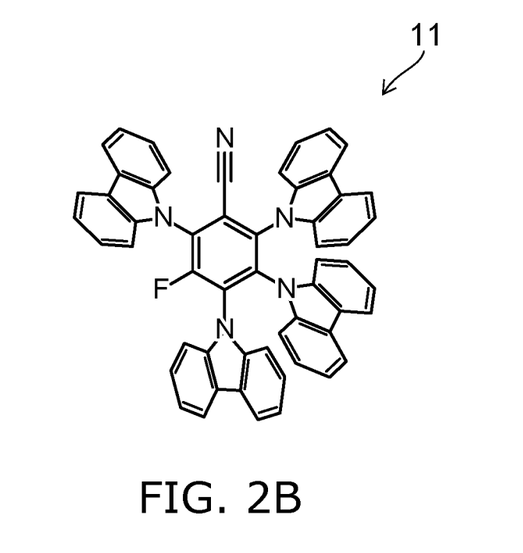

FIG. 2A shows an example of the first organic substance 11. In the example, the first organic substance 11 includes 2,4,5,6-tetra(9H-carbazole-9-yl)-5-fluorobenzonitrile. FIG. 2B shows another example of the first organic substance 11. In the example, the first organic substance 11 includes 2,4,5,6-tetra(9H-carbazole-9-yl)isophthalonitrile.

As described below, the first organic substance 11 may include a thermally activated delayed fluorescence material. For example, the difference between the energy of the excited triplet state of the first organic substance 11 and the energy of the excited singlet state of the first organic substance 11 is not more than 500 meV. The light emission life of such a first organic substance 11 is long.

The third organic substance 13 is a polymer. The third organic substance 13 is located around the first organic substance 11 and the second organic substance 12.

Figure 4:
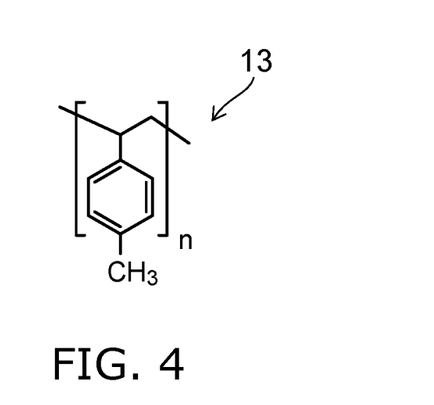
FIG. 4 is a schematic view illustrating a portion of the scintillator according to the first embodiment.

FIG. 4 shows an example of the third organic substance 13. The third organic substance 13 may include, for example, the polyvinyl toluene illustrated in FIG. 4, etc. The third organic substance 13 may include, for example, at least one selected from the group consisting of polyvinyl toluene, polyvinyl carbazole, and polymethyl methacrylate. The third organic substance 13 is a light-transmissive polymer.

The second organic substance 12 includes at least one selected from the group consisting of a carbonyl group (C=O), phosphine oxide (P=O), and a sulfinyl group (S=O).

Figure 3:
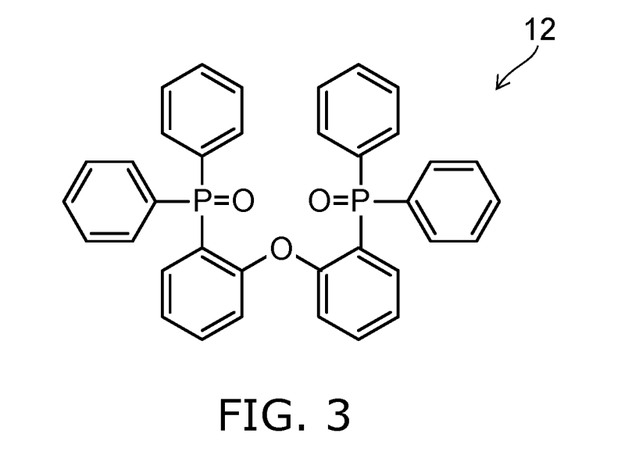
FIG. 3 is a schematic view illustrating a portion of the scintillator according to the first embodiment.

FIG. 3 shows an example of the second organic substance 12. The second organic substance 12 may include, for example, the bis[2-(diphenylphosphino)phenyl]ether oxide illustrated in FIG. 3, etc. Other examples of the second organic substance 12 are described below.

As shown in FIG. 1, for example, the first layer 10 spreads along an X-Y plane. A Y-axis direction is perpendicular to an X-axis direction. A Z-axis direction is perpendicular to the X-axis direction and the Y-axis direction. A thickness t1 of the first layer 10 is the length along the Z-axis direction.

The first layer 10 that includes the first organic substance 11, the second organic substance 12, and the third organic substance 13 such as those described above is an organic layer. The scintillator 10S that includes such a first layer 10 is an organic scintillator.

According to the embodiment, the first layer 10 includes the second organic substance 12 in addition to the first organic substance 11 that emits light. It was found that a high luminous efficiency is obtained by such a configuration. Examples of experiment results performed by the inventor will now be described.

Figure 5A:
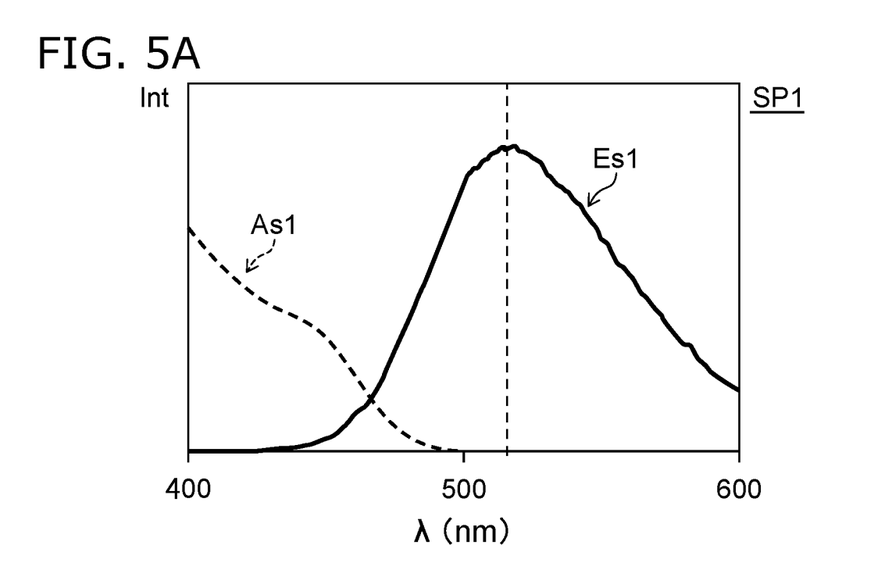
FIGS. 5A and 5B are graphs illustrating experiment results relating to the scintillator.
Figure 5B:
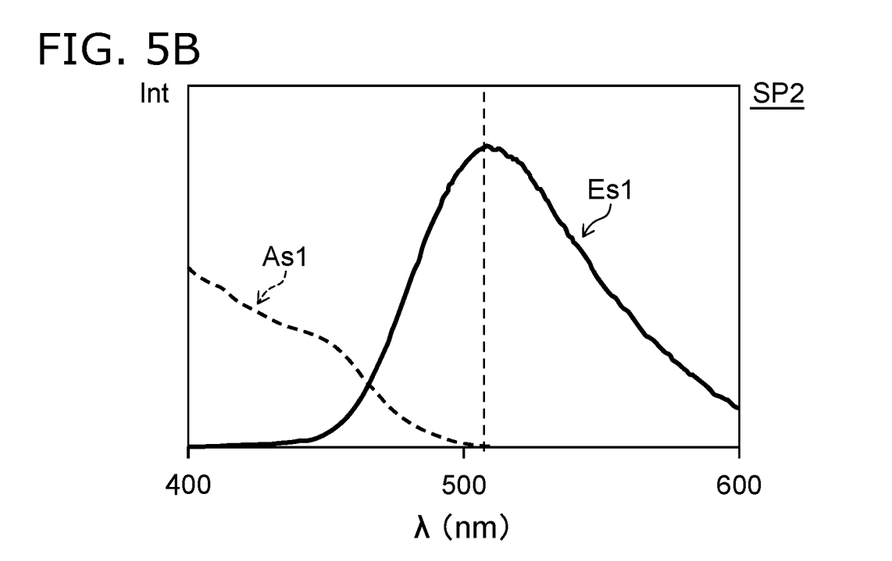

FIGS. 5A and 5B are graphs illustrating experiment results relating to the scintillator.

FIG. 5A corresponds to a first sample SP1. FIG. 5B corresponds to a second sample SP2. In the first sample SP1, the first layer 10 includes the first organic substance 11, the second organic substance 12, and the third organic substance 13. In the example, the first organic substance 11 is 2,4,5, 6-tetra(9H-carbazole-9-yl)-5-fluorobenzonitrile. The second organic substance 12 is bis[2-(diphenylphosphino)phenyl] ether oxide. The third organic substance 13 is polyvinyl toluene. In the first sample SP1, the concentration of the first organic substance 11 in the first layer 10 is 6 wt %. The concentration of the second organic substance 12 in the first layer 10 is 47 wt %.

In the second sample SP2, the first layer 10 includes the first organic substance 11 and the third organic substance 13. Other than not including the second organic substance 12, the conditions of the second sample SP2 are the same as the conditions of the first sample SP1.

For example, the first sample SP1 and the second sample SP2 were obtained by coating a solution that includes a solvent and organic substances as raw materials on a substrate, and by removing the solvent. In the first and second samples SP1 and SP2, the thickness t1 of the first layer 10 (referring to FIG. 1) is 50 nm. Optical characteristics of these samples were evaluated. The optical characteristics are the light emission spectrum and the absorption spectrum. In FIGS. 5A and 5B, the horizontal axis is a wavelength $\lambda$. The vertical axis is a relative intensity Int.

In the second sample SP2 as shown in FIG. 5B, the first layer 10 includes an absorption intensity As1 (an absorptance) and a light emission intensity Es1. The absorption intensity As1 is high at not more than about 500 nm. The light emission intensity Es1 has a peak at a wavelength $\lambda$ of about 505 nm. The absorption spectrum overlaps the light emission spectrum in the range in which the wavelength $\lambda$ is 450 nm to 500 nm. Therefore, in the first layer 10, the light that is emitted from the first organic substance 11 is absorbed and disappears inside the first layer 10. In the second sample SP2, the fraction of the reabsorbed light emission is 0.34. In the second sample SP2, the luminous efficiency is about 56%.

In the first sample SP1 as shown in FIG. 5A as well, the first layer 10 includes the absorption intensity As1 (the absorptance) and the light emission intensity Es1. The absorption intensity As1 is high at not more than about 500 nm. On the other hand, the light emission intensity Es1 has a peak at a wavelength $\lambda$ of about 518 nm. Thus, the wavelength $\lambda$ of the light emission peak is longer in the first sample SP1 than in the second sample SP2. As a result, the region in which the absorption spectrum overlaps the light emission spectrum is smaller in the first sample SP1 than in the second sample SP2. Therefore, in the first layer 10, the light that is emitted from the first organic substance 11 is prevented from being absorbed inside the first layer 10. The fraction of the reabsorbed light emission in the first sample SP1 is 0.23. In the first sample SP1, the luminous efficiency is about 73%.

Thus, because the first layer 10 includes the second organic substance 12, the peak of the light emission spectrum can have a longer wavelength. A high luminous efficiency is obtained thereby. According to the embodiment, a scintillator can be provided in which the efficiency can be increased.

The second organic substance 12 includes at least one selected from the group consisting of a carbonyl group, phosphine oxide, and a sulfinyl group. High polarization is obtained by such a configuration. It is considered that the excited state is stabilized thereby. It is considered that the peak wavelength of the light emission can be increased thereby.

According to the embodiment, the absorption wavelength band of the second organic substance 12 is, for example, not more than 380 nm. The absorption by the second organic substance 12 of the light emitted from the first organic substance 11 is suppressed thereby. The absorptance of the second organic substance 12 for a wavelength of 390 nm is not more than 0.01%.

According to the embodiment, the triplet level of the second organic substance 12 is high. The absorption by the second organic substance 12 of the light emitted from the first organic substance 11 is suppressed thereby. The triplet level is, for example, not less than 2.9 eV. The triplet level of the second organic substance 12 is higher than the triplet level of the first or third organic substance 11 or 13.

According to the embodiment, for example, the molecular weight of the second organic substance 12 is less than the molecular weight of the third organic substance 13. The molecular weight of the second organic substance 12 is, for example, not less than 100 and not more than 1,000. The molecular weight of the third organic substance 13 is, for example, not less than 5,000 and not more than 100,000. For example, the third organic substance 13 functions as a resin matrix. For example, when the resin matrix includes at least one selected from the group consisting of a carbonyl group, phosphine oxide, and a sulfinyl group, the resin matrix is easily degraded by radiation.

According to the embodiment, it is favorable for the third organic substance 13 to substantially not include a carbonyl group, phosphine oxide, and a sulfinyl group. Stable characteristics of the first layer 10 are obtained thereby. According to the embodiment, by providing the second organic substance 12 that has a structure inducing a large polarization separately from the resin matrix, the peak wavelength of the light emission can be increased while suppressing degradation due to radiation.

An example of results of experiments in which the concentration of the second organic substance 12 is modified when the first layer 10 includes the first to third organic substances 11 to 13 will now be described. In the experiment, the materials of the first to third organic substances 11 to 13 are the same as the materials of the first sample SP1 described above.

Figure 6A:
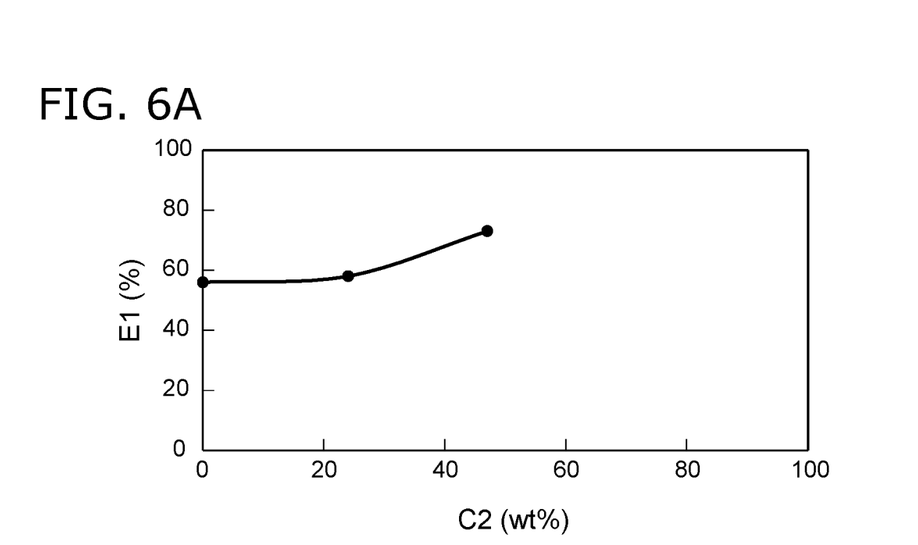
FIGS. 6A and 6B are graphs illustrating experiment results relating to the scintillator.
Figure 6B:
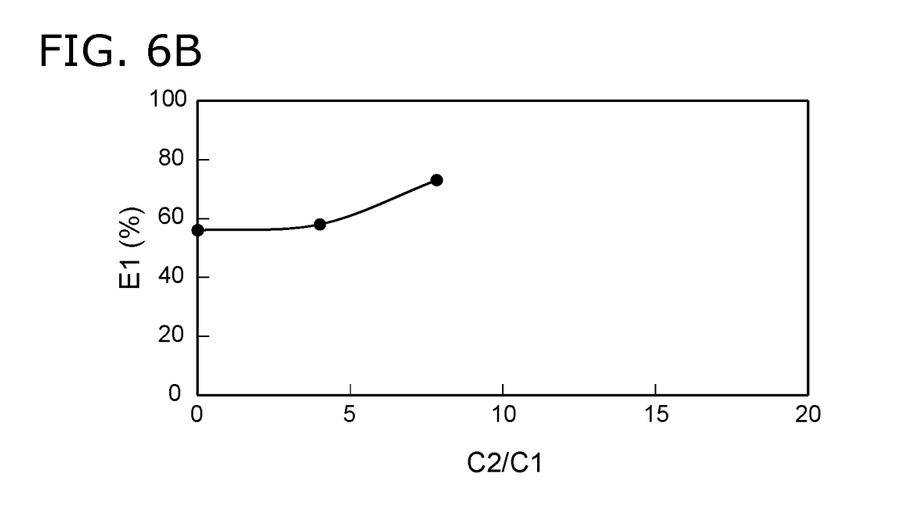

FIGS. 6A and 6B are graphs illustrating experiment results relating to the scintillator.

The horizontal axis of FIG. 6A is the weight concentration (a second weight concentration C2) of the second organic substance 12 in the first layer 10. The horizontal axis of FIG. 6B is a concentration ratio R1. The concentration ratio R1 is the ratio (C2/C1) of the weight concentration (the second weight concentration C2) of the second organic substance 12 in the first layer 10 to the weight concentration (a first weight concentration C1) of the first organic substance 11 in the first layer 10. In these figures, the vertical axis is a luminous efficiency E1.

As shown in FIG. 6A, the luminous efficiency E1 increases as the second weight concentration C2 increases. According to the embodiment, it is favorable for the concentration (the second weight concentration C2) of the second organic substance 12 in the first layer 10 to be, for example, not less than 10 wt % and not more than 50 wt %. A high luminous efficiency E1 is easily obtained thereby. The second weight concentration C2 may be not less than 20%.

As shown in FIG. 6B, the luminous efficiency E1 increases as the ratio (C2/C1) increases. According to the embodiment, it is favorable for the second weight concentration C2 of the second organic substance 12 in the first layer 10 to be greater than the first weight concentration C1 of the first organic substance 11 in the first layer 10. A high luminous efficiency E1 is easily obtained thereby.

As shown in FIG. 6B, a high luminous efficiency E1 is easily obtained when the ratio (C2/C1) is not less than 4. According to the embodiment, it is favorable for the second weight concentration C2 to be not less than 4 times the first weight concentration C1. A high luminous efficiency E1 is easily obtained thereby.

According to the embodiment, it is favorable for the second weight concentration C2 to be not more than 10 times the first weight concentration C1. A reduction of the luminous efficiency caused by aggregation, etc., can be suppressed thereby.

According to the embodiment, it is favorable for the thickness t1 of the first layer 10 to be, for example, not less than 200 µm and not more than 1,500 µm. Because the thickness t1 of the first layer 10 is not less than 200 µm, a light emission of high intensity is obtained. Because the thickness t1 is not more than 1,500 µm, a uniform first layer 10 is stably and easily obtained.

According to the embodiment, the second organic substance 12 may include at least one selected from the group consisting of 1,3-bis(3-(diphenylphosphoryl)phenyl)benzene, 10-phenyl-10H,10'H-spiro[acridine-9,9'-anthracen]-10'-one, and 9,9'-(5-(phenylsulfonyl)-1,3-phenylene)-bis(9H-carbazole) (9,9'-(5-(phenylsulfonyl)-1,3-phenylene)-bis(9H-carbazole)).

According to the embodiment, it is favorable for the second organic substance 12 to include an aromatic compound. The aromatic compound includes at least one selected from the group consisting of a carbonyl group, phosphine oxide, and a sulfinyl group. For example, steric hindrance easily occurs because the second organic substance 12 includes the aromatic compound. The interaction between the second organic substance 12 and the first organic substance 11 is easily suppressed by the steric hindrance. Unfavorable effects of the second organic substance 12 on the first organic substance 11 are suppressed thereby. The peak wavelength of the light emission can be increased while suppressing the unfavorable effects on the other characteristics.

In the scintillator 10S according to the embodiment, it is favorable for the light emission life to be long. Thereby, a high detection accuracy is easily obtained when the scintillator 10S is combined with a light detecting part.

An example of light emission characteristics of the scintillator 10S will now be described.

Figure 7A:
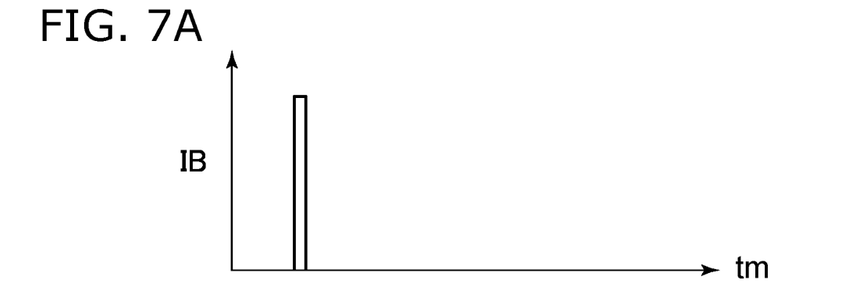
FIGS. 7A and 7B are schematic views illustrating characteristics of the scintillator.
Figure 7B:
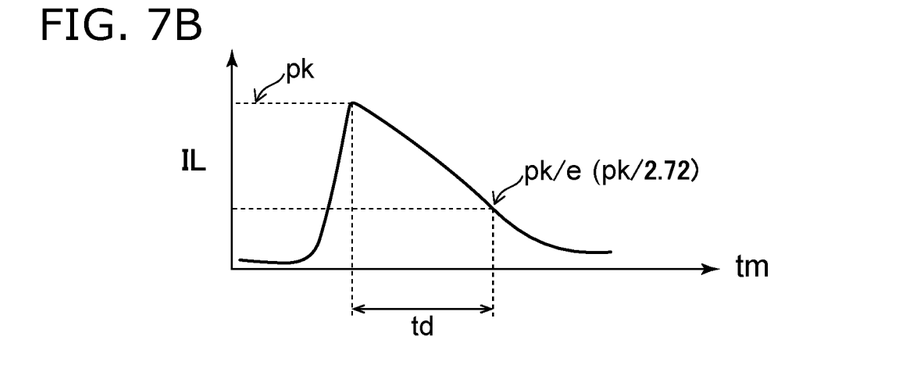

FIGS. 7A and 7B are schematic views illustrating characteristics of the scintillator.

In these figures, the horizontal axis is a time tm. The axis of FIG. 7A is an intensity IB of beta rays. The vertical axis of FIG. 7B is an intensity IL of the light generated by an organic material when the beta rays are incident on the organic material.

As shown in FIG. 7B, light is generated based on the beta rays. The intensity IL of the light has a maximum value pk. The intensity IL of the light attenuates after the maximum value pk; and there is a time at which the intensity IL becomes a value of 1/2.72 of the maximum value pk. The period after irradiating the beta rays from the time at which the intensity IL of the light becomes the maximum value pk until the intensity IL of the light drops to 1/2.72 of the maximum value pk of the intensity IL of the light is taken as an emission lifetime td. For example, "1/2.72 of the maximum value pk" corresponds to "1/e of the maximum value pk" (e being Napier's constant). Napier's constant e is the base of the natural logarithm and is about 2.71828.

The emission lifetime td is long in the first organic substance 11. For example, the emission lifetime td of the first organic substance 11 is not less than 10 ns. As described below, because the emission lifetime td of the first organic substance 11 is long, a high detection efficiency and a high detection selectivity are obtained for beta rays.

Thus, in the scintillator 10S according to the embodiment, the first layer 10 emits light based on the beta rays incident on the first layer 10. The period (the emission lifetime td) from the time of the maximum value of the intensity of the light until the intensity of the light drops to 1/2.72 of the maximum value is, for example, not less than 10 ns. The emission lifetime td may be not less than 100 ns. The emission lifetime td may be not less than 300 ns.

According to the embodiment, the first organic substance 11 includes, for example, a benzene derivative that includes carbazole and a cyano group. Thereby, for example, dissolving in the organic solvent is easier. For example, a high luminous efficiency is easily obtained.

According to the embodiment, for example, the first organic substance 11 may include, for example, at least one selected from the group consisting of 2,4,5,6-tetra(9H-carbazole-9-yl)isophthalonitrile, 2,4,6-tris(4-(9,9-methylacridan-10-yl)phenyl)-1,3,5-triazine, 10-(4-(bis(2,3,5-tetramethylphenyl)boranyl)-2,3,5-tetramethyl phenyl)-10H-phenoxazine, 2,4,6-tri(9H-carbazole-9-yl)-3,5-difluorobenzonitrile, and 9-[1,4]benzoxaborino[2,3,4-kl]phenoxaborin-7-yl-1,3,6,8-tetra methyl-9H-carbazole.

Second Embodiment

A second embodiment is related to a radiation detector.

Figure 8:
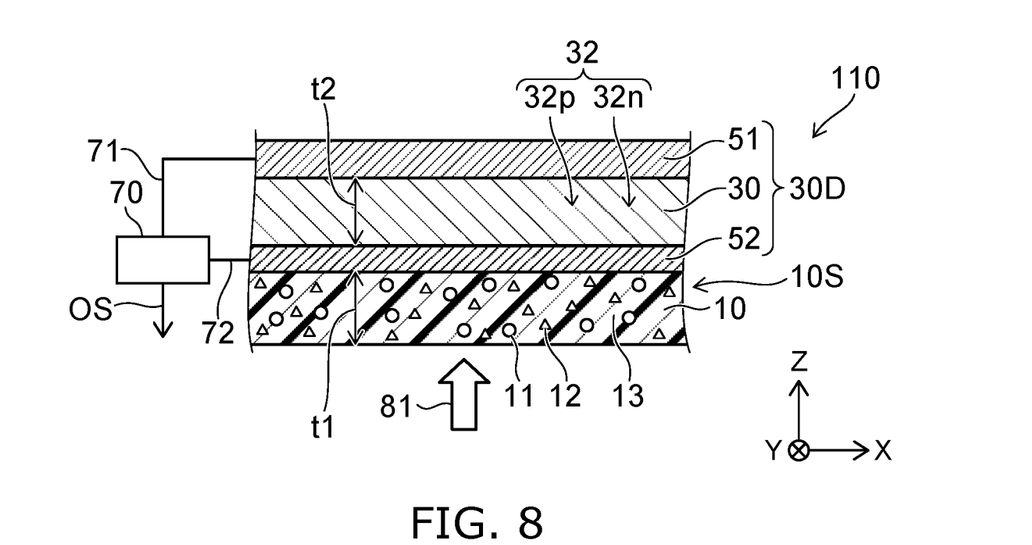
FIG. 8 is a schematic cross-sectional view illustrating a radiation detector according to a second embodiment.

FIG. 8 is a schematic cross-sectional view illustrating the radiation detector according to the second embodiment.

As shown in FIG. 8, the radiation detector 110 according to the embodiment includes a light detecting part 30D and the scintillator 10S (including modifications of the scintillator 10S) according to the first embodiment. The light detecting part 30D is configured to detect light from the first layer 10.

In the example, the light detecting part 30D includes a first conductive layer 51, a second conductive layer 52, and an organic semiconductor layer 30. The second conductive layer 52 is located between the first layer 10 and the first conductive layer 51. The organic semiconductor layer 30 is located between the first conductive layer 51 and the second conductive layer 52.

The organic semiconductor layer 30 includes, for example, a p-type region 32p and an n-type region 32n. The p-type region 32p and the n-type region 32n are included in an organic semiconductor 32.

A detection circuit 70 is included in the example. The detection circuit 70 is electrically connected with the first and second conductive layers 51 and 52. For example, the detection circuit 70 is electrically connected with the first conductive layer 51 by a first wiring 71. For example, the detection circuit 70 is electrically connected with the second conductive layer 52 by a second wiring 72. The detection circuit 70 outputs a signal OS that corresponds to the intensity of radiation 81 incident on the first layer 10.

The radiation 81 includes, for example, beta rays. The radiation 81 may include, for example, gamma rays. For example, the radiation 81 enters through the first layer 10 side.

When the radiation 81 enters the first layer 10, light is generated in the first layer 10. The generated light passes through the second conductive layer 52 and enters the organic semiconductor layer 30. Based on the light that enters, the organic semiconductor layer 30 generates a movable charge. A voltage is applied between the first conductive layer 51 and the second conductive layer 52 by the detection circuit 70. Thereby, the generated charge moves toward the first conductive layer 51 or the second conductive layer 52. The moved charge is detected by the detection circuit 70. The radiation 81 of the detection object can be detected thereby. For example, the organic semiconductor layer 30 functions as a photoelectric conversion layer.

As shown in FIG. 8, the organic semiconductor layer 30 has a thickness (a second thickness t2) along the Z-axis direction. It is favorable for the second thickness t2 to be, for example, not less than 500 nm and not more than 50 μm. For example, a high detection accuracy is obtained.

For example, the first layer 10 functions as at least a portion of an organic scintillator. For example, the first layer 10 is not an inorganic scintillator.

The gamma rays that are incident on the first layer 10 substantially pass through the first layer 10. Light is efficiently generated from the first layer 10 based on the beta rays that are incident on the first layer 10. The light is, for example, fluorescence. The intensity of the light is high. Light of a high intensity passes through the second conductive layer 52 and is incident on the organic semiconductor layer 30. In the organic semiconductor layer 30, the light of the high intensity is converted into a charge; and the signal OS of a high intensity is obtained.

According to the embodiment, for example, the effects of gamma rays can be suppressed, and beta rays can be detected with high sensitivity. According to the embodiment, the effects of gamma rays can be suppressed, and beta rays can be detected with high sensitivity.

According to the embodiment, the organic semiconductor layer 30 is used as a photoelectric conversion layer. The effects of gamma rays on the photoelectric conversion characteristics can be suppressed thereby. Generally, the rate (the mobility) of the movement of the charge in the organic semiconductor layer 30 is slower than the rate (the mobility) of the movement of the charge in an inorganic semiconductor layer. Therefore, when the first layer 10 has the emission lifetime td that is suited to the period necessary for the movement of the charge in the organic semiconductor layer 30, a high detection efficiency and a high detection selectivity are obtained for beta rays.

It is favorable for the emission lifetime td to be not less than 10 ns. The emission lifetime td may be not less than 100 ns. The emission lifetime td may be not less than 300 ns. When the emission lifetime td is excessively long, for example, it easily becomes difficult to separate from a signal based on another incidence of beta rays. The emission lifetime td may be, for example, not more than 100 μs. The separation is easier.

According to the embodiment, the intensity of the signal OS (referring to FIG. 1) obtained when beta rays are incident on the first layer 10 is greater than the intensity of the signal OS obtained when other radiation (gamma rays, neutron rays, X-rays, etc.) are incident on the first layer 10. For example, the sensitivity (the intensity) of the first signal generated between the first conductive layer 51 and the second conductive layer 52 when beta rays are incident on the first layer 10 is greater than the sensitivity (the intensity) of the second signal generated between the first conductive layer 51 and the second conductive layer 52 when at least one of gamma rays, neutron rays, or X-rays are incident on the first layer 10.

Figure 9:
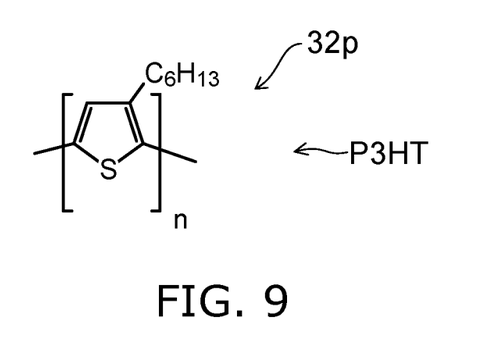
FIG. 9 is a schematic view illustrating a portion of the radiation detector according to the second embodiment.
Figure 10:
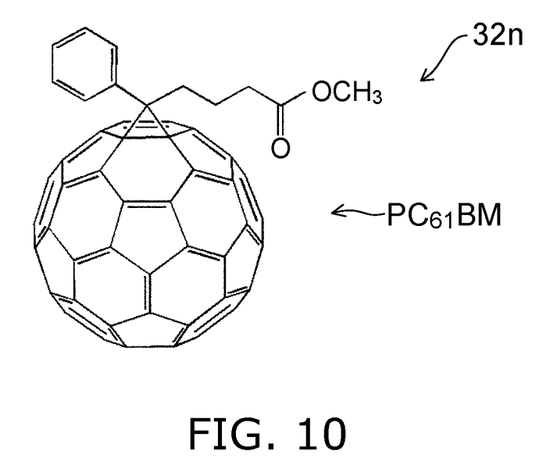
FIG. 10 is a schematic view illustrating a portion of the radiation detector according to the second embodiment.

FIGS. 9 and 10 are schematic views illustrating a portion of the radiation detector according to the second embodiment. FIG. 9 illustrates the p-type region 32p. In the example, the p-type region 32p includes P3HT (poly(3-hexylthiophene)).

FIG. 10 illustrates the n-type region 32n. For example, the n-type region 32n includes a fullerene derivative. In the example, the n-type region 32n includes $PC_{61}BM$ ([6,6]-phenyl-$C_{61}$-butyric acid methyl ester). Thus, for example, the organic semiconductor layer 30 includes polythiophene and a fullerene derivative.

Figure 11:
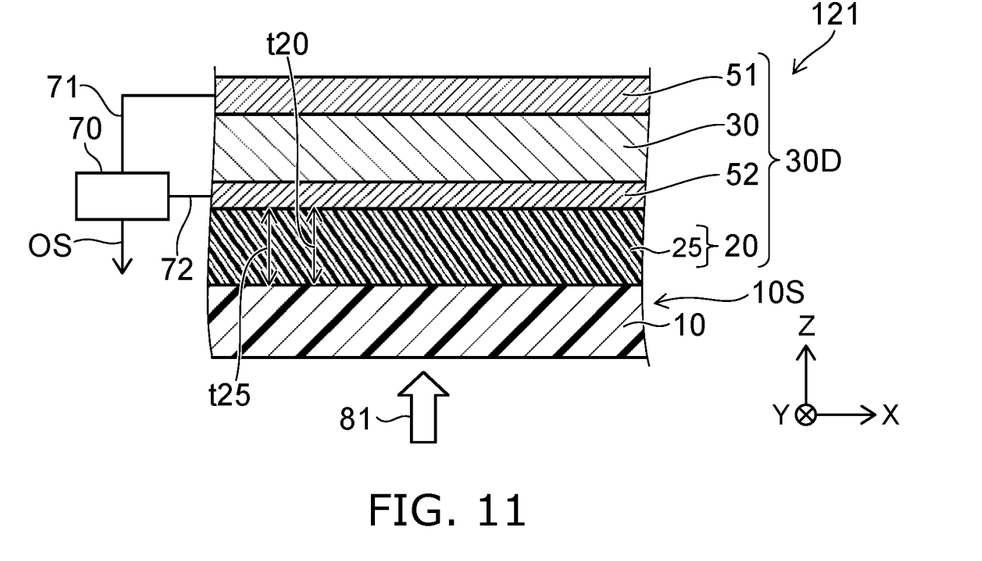
FIG. 11 is a schematic cross-sectional view illustrating a radiation detector according to the second embodiment.

FIG. 11 is a schematic cross-sectional view illustrating a radiation detector according to the second embodiment.

As shown in FIG. 11, the radiation detector 121 according to the embodiment further includes a second layer 20 in addition to the first layer 10, the first conductive layer 51, the second conductive layer 52, and the organic semiconductor layer 30. The first layer 10, the first conductive layer 51, the second conductive layer 52, and the organic semiconductor layer 30 according to the embodiment may be similar to those described above. Examples of the second layer 20 will now be described.

The second layer 20 is located between the first layer 10 and the second conductive layer 52. The second layer 20 includes an organic layer 25. The organic layer 25 includes, for example, at least one selected from the group consisting of PET, PEN, transparent polyimide, cycloolefin polymer (COP), and polycarbonate. The organic layer 25 is, for example, an organic film.

A thickness t20 of the second layer 20 is, for example, not less than 10 μm and not more than 300 μm. A thickness t25 of the organic layer 25 is, for example, not less than 10 μm and not more than 300 μm. In the example, the thickness t20 corresponds to the thickness t25.

The second layer 20 is light-transmissive. The light that is generated by the first layer 10 passes through the second layer 20 and the second conductive layer 52 and can be incident on the organic semiconductor layer 30.

By providing the second layer 20, the movement of substances included in the first layer 10 toward the second conductive layer 52 and the organic semiconductor layer 30 can be suppressed. High reliability is easily obtained.

Because the second layer 20 includes the organic layer 25, the conversion of gamma rays into light by the second layer 20 can be suppressed even when gamma rays are incident. Beta rays can be detected with high accuracy while suppressing the effects of gamma rays. For example, the second layer 20 functions as a base body. The mechanical strength of the radiation detector 121 is increased by the second layer 20.

Figure 12:
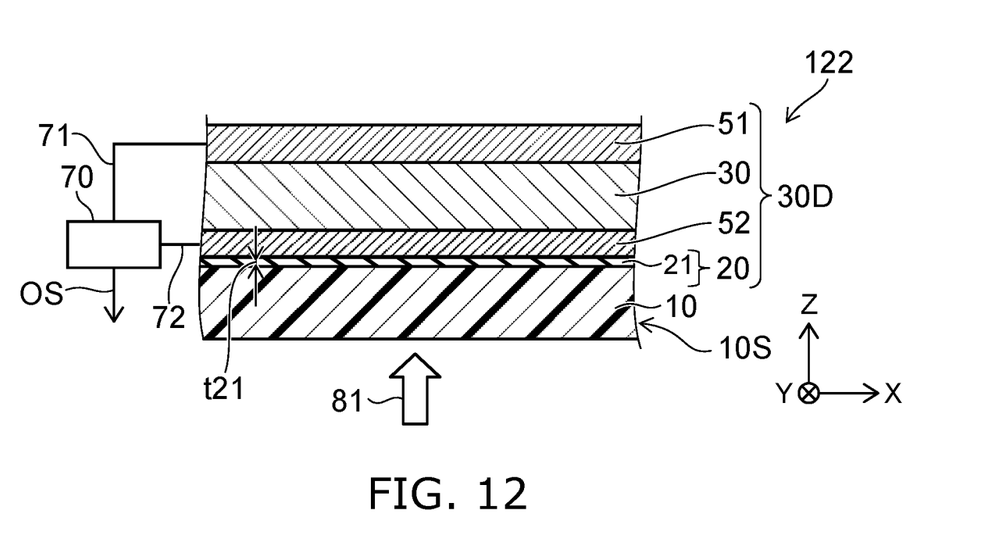
FIG. 12 is a schematic cross-sectional view illustrating a radiation detector according to the second embodiment.

FIG. 12 is a schematic cross-sectional view illustrating a radiation detector according to the second embodiment.

As shown in FIG. 12, the radiation detector 122 according to the embodiment also includes the first layer 10, the first conductive layer 51, the second conductive layer 52, the organic semiconductor layer 30, and the second layer 20. In the radiation detector 122, the second layer 20 includes a first intermediate layer 21. The first intermediate layer 21 includes, for example, silicon oxynitride. The first intermediate layer 21 may include silicon oxide, silicon nitride, aluminum oxide, etc. For example, good barrier properties are obtained due to the first intermediate layer 21. For example, the movement of substances included in the first layer 10 toward the second conductive layer 52 and the organic semiconductor layer 30 can be suppressed. High reliability is easily obtained.

It is favorable for a thickness t21 of the first intermediate layer 21 to be thin. When the thickness t21 is excessively thick, gamma rays may be converted into light by the first intermediate layer 21 when gamma rays are incident. By setting the thickness t21 to be thin, the effects of gamma rays can be suppressed. The thickness t21 is, for example, not more than 2 μm.

Figure 13:
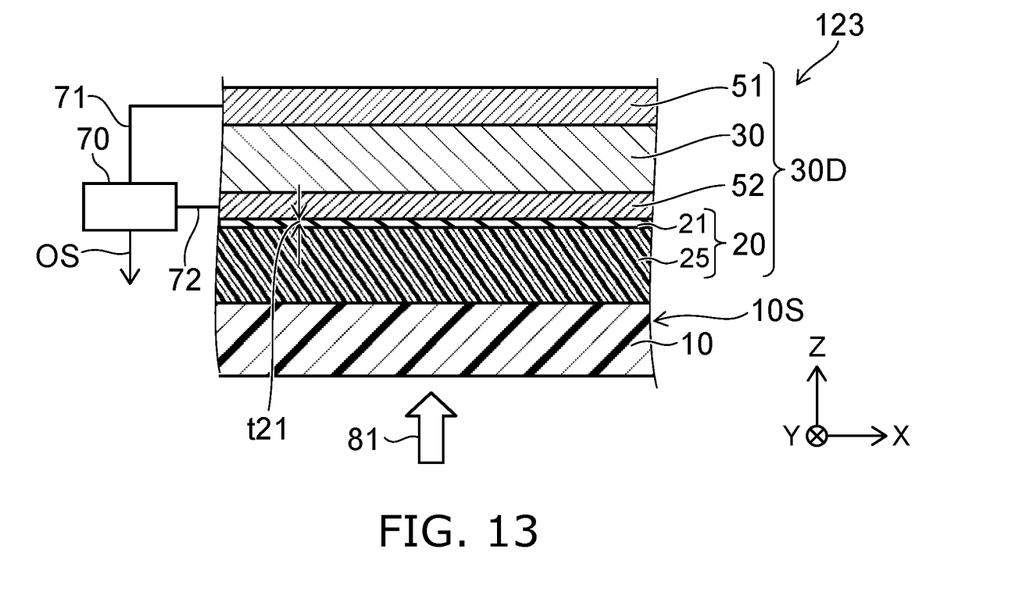
FIG. 13 is a schematic cross-sectional view illustrating a radiation detector according to the embodiment.
Figure 14:
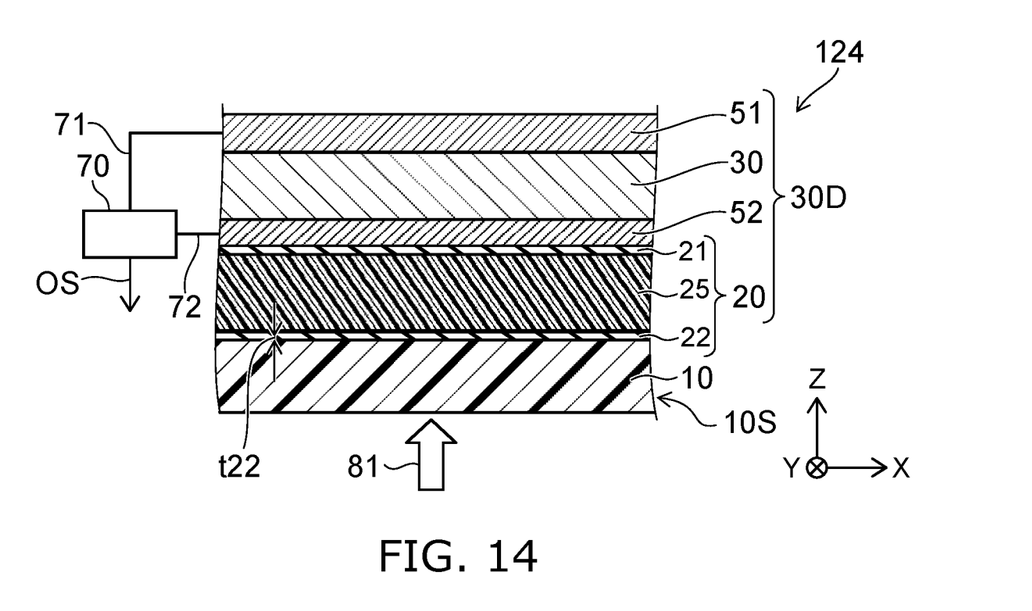
FIG. 14 is a schematic cross-sectional view illustrating a radiation detector according to the embodiment.

FIGS. 13 and 14 are schematic cross-sectional views illustrating radiation detectors according to the embodiment.

In a radiation detector 123 according to the embodiment as shown in FIG. 13, the second layer 20 includes the organic layer 25 and the first intermediate layer 21. In a radiation detector 124 according to the embodiment as shown in FIG. 14, the second layer 20 includes the organic layer 25, the first intermediate layer 21, and a second intermediate layer 22. The second layer 20 may include at least one of the first intermediate layer 21 or the second intermediate layer 22.

The first intermediate layer 21 is located between the organic layer 25 and the second conductive layer 52. The first intermediate layer 21 includes a first element that includes at least one of silicon or aluminum. The second intermediate layer 22 is located between the first layer 10 and the organic layer 25. The second intermediate layer 22 includes a second element that includes at least one of silicon or aluminum. The first intermediate layer 21 includes, for example, the first element described above and at least one of oxygen or nitrogen. The first intermediate layer 21 includes, for example, silicon oxynitride. The second intermediate layer 22 includes the second element described above and at least one of oxygen or nitrogen. The second intermediate layer 22 includes, for example, silicon oxynitride.

The thickness t21 of the first intermediate layer 21 (referring to FIG. 13) is not less than 1/600 times and not more than 1/5 times the thickness t25 of the organic layer 25 (referring to FIG. 11). A thickness t22 of the second intermediate layer 22 is not less than 1/600 times and not more than 1/5 times the thickness t25 of the organic layer 25. By setting the thicknesses of these intermediate layers to be thin, beta rays can be detected with high accuracy while suppressing the effects of gamma rays.

For example, good barrier properties are obtained due to at least one of the first intermediate layer 21 or the second intermediate layer 22. For example, the movement of substances included in the first layer 10 toward the second conductive layer 52 and the organic semiconductor layer 30 can be suppressed. High reliability is easily obtained.

Figure 15:
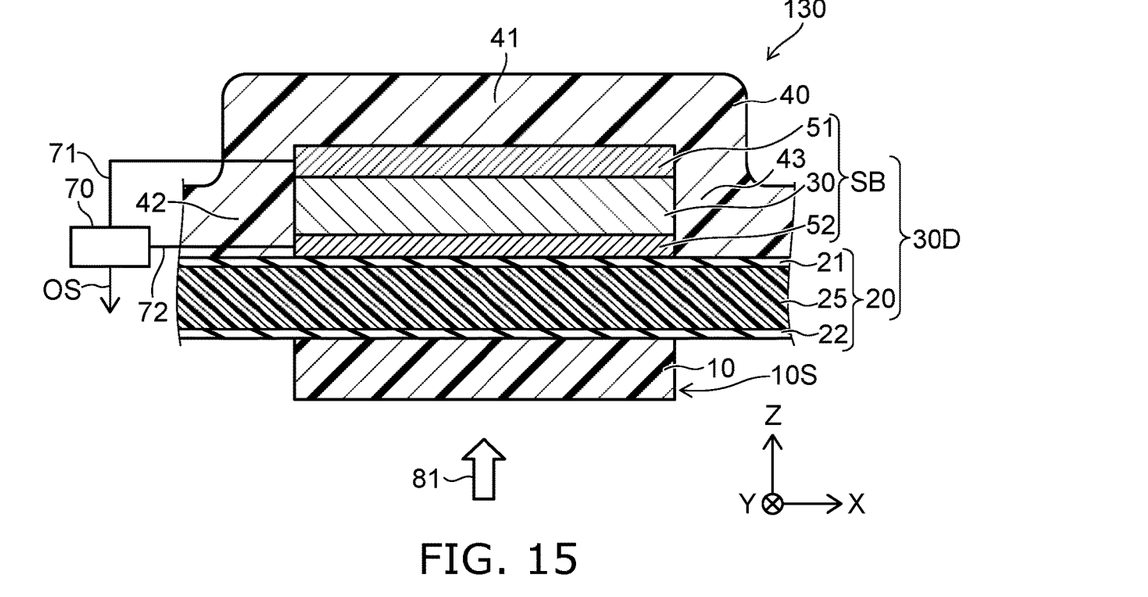
FIG. 15 is a schematic cross-sectional view illustrating a radiation detector according to the second embodiment.

FIG. 15 is a schematic cross-sectional view illustrating a radiation detector according to the second embodiment.

As shown in FIG. 15, the radiation detector 130 according to the embodiment includes a structure body 40 in addition to the first layer 10, the first conductive layer 51, the second conductive layer 52, the organic semiconductor layer 30, and the second layer 20. The configurations described above are applicable to the first layer 10, the first conductive layer 51, the second conductive layer 52, the organic semiconductor layer 30, and the second layer 20 of the radiation detector 130. In the example, the second layer 20 includes the organic layer 25, the first intermediate layer 21, and the second intermediate layer 22. In the radiation detector 130, the second layer 20 may include at least one of the first intermediate layer 21 or the second intermediate layer 22. An example of the structure body 40 will now be described.

The structure body 40 includes a first partial region 41, a second partial region 42, and a third partial region 43. The second layer 20 is between the first layer 10 and the first partial region 41 in a first direction (e.g., the Z-axis direction). The first conductive layer 51, the second conductive layer 52, and the organic semiconductor layer 30 are between the second layer 20 and the first partial region 41 in the first direction. Thus, a stacked body SB that includes the first conductive layer 51, the second conductive layer 52, and the organic semiconductor layer 30 is located between the second layer 20 and the first partial region 41.

The stacked body SB (the first conductive layer 51, the second conductive layer 52, and the organic semiconductor layer 30) is between the second partial region 42 and the third partial region 43 in a second direction that crosses the first direction. The second direction is any direction that crosses the first direction (the Z-axis direction). In the example, the second direction is the X-axis direction. For example, the second partial region 42 and the third partial region 43 are located around the stacked body SB in the X-Y plane (in a plane crossing the first direction). For example, the second partial region 42 and the third partial region 43 surround the stacked body SB in the X-Y plane. The second partial region 42 and the third partial region 43 are bonded with the second layer 20. For example, the second partial region 42 and the third partial region 43 may be directly bonded with the second layer 20. For example, the second partial region 42 and the third partial region 43 may be bonded with the second layer 20 via an adhesive layer, etc.

For example, the organic semiconductor layer 30 is sealed with the second layer 20 and the structure body 40. For example, the second layer 20 and the structure body 40 function as sealing parts. High reliability is obtained due to the second layer 20 and the structure body 40.

Figure 16:
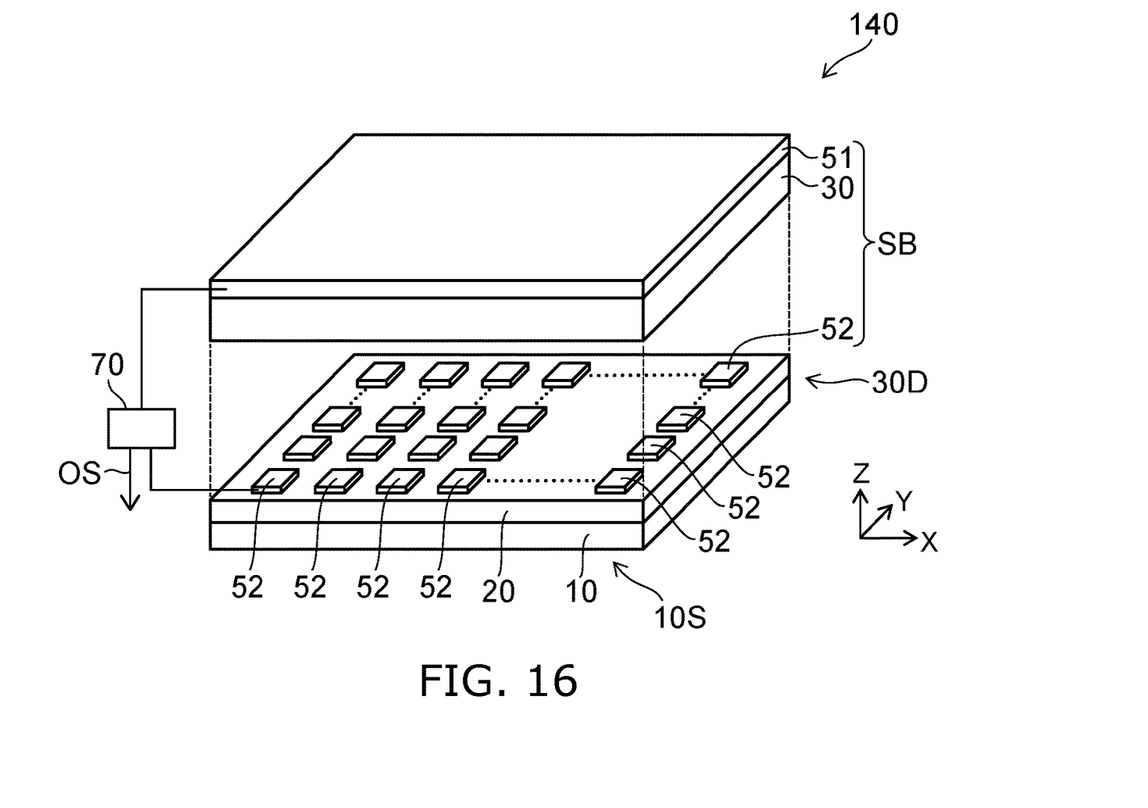
FIG. 16 is a schematic perspective view illustrating a radiation detector according to the second embodiment.

FIG. 16 is a schematic perspective view illustrating a radiation detector according to the second embodiment.

As shown in FIG. 16, the radiation detector 140 according to the embodiment includes the first layer 10, the first conductive layer 51, the second conductive layer 52, the organic semiconductor layer 30, and the second layer 20. The radiation detector 140 may include the structure body 40. In FIG. 16, portions of the components included in the radiation detector 140 are drawn as being separated from each other for easier viewing of the drawing.

The radiation detector 140 includes multiple second conductive layers 52. The multiple second conductive layers 52 are arranged along a plane (e.g., the X-Y plane) that crosses the Z-axis direction. For example, the multiple second conductive layers 52 are arranged in a matrix configuration along the X-axis direction and the Y-axis direction. In the example, the first conductive layer 51 and the organic semiconductor layer 30 are continuous.

According to the embodiment, the second conductive layer 52 includes, for example, a metal oxide film. The metal oxide film includes, for example, at least one selected from the group consisting of indium oxide, zinc oxide, tin oxide, and ITO.

The first conductive layer 51 includes, for example, a metal thin film. The first conductive layer 51 includes, for example, a film that includes an alloy. The first conductive layer 51 may include, for example, a conductive metal oxide. For example, the first conductive layer 51 may be light-reflective. The efficiency of the photoelectric conversion of the organic semiconductor layer 30 can be increased.

An intermediate layer may be located between the organic semiconductor layer 30 and the first conductive layer 51 and/or between the organic semiconductor layer 30 and the second conductive layer 52. The intermediate layer includes, for example, PEDOT:PSS. The intermediate layer includes a polythiophene polymer.

According to the embodiment, the radiation detector may include the detection circuit 70 (referring to FIG. 8, etc.) that is electrically connected with the first and second conductive layers 51 and 52. The detection circuit 70 outputs the signal OS that corresponds to the intensity of the radiation 81 incident on the first layer 10. The sensitivity of the signal OS to beta rays is greater than the sensitivity of the signal OS to gamma rays. The ratio of the change of the signal OS to the change of the intensity of beta rays is greater than the ratio of the change of the signal OS to the change of the intensity of gamma rays. According to the embodiment, beta rays can be detected with high accuracy while suppressing the effects of gamma rays. The radiation 81 can be detected with a high efficiency.

Embodiments may include the following configurations (e.g., technological proposals).

Configuration 1
A scintillator, comprising:
a first layer,
the first layer includes
a first organic substance capable of emitting light, and
a second organic substance,
the second organic substance includes at least one selected from the group consisting of a carbonyl group, phosphine oxide, and a sulfinyl group,
the first layer emits light based on beta rays incident on the first layer,
a period from a time of a maximum value of an intensity of the light until the intensity of the light drops to 1/2.72 of the maximum value is not less than 10 ns.

Configuration 2
The scintillator according to Configuration 1, wherein
the first organic substance includes a thermally activated delayed fluorescence material.

Configuration 3
The scintillator according to Configuration 1 or 2, wherein
the first layer further includes a third organic substance,
the third organic substance is a polymer, and
the third organic substance is located around the first and second organic substances.

Configuration 4
The scintillator according to Configuration 3, wherein
a molecular weight of the second organic substance is less than a molecular weight of the third organic substance.

Configuration 5
The scintillator according to Configuration 3, wherein
a molecular weight of the second organic substance is not less than 100 and not more than 1,000.

Configuration 6
The scintillator according to any one of Configurations 1 to 5, wherein
a concentration of the second organic substance in the first layer is not less than 10 wt % and not more than 50 wt %.

Configuration 7
The scintillator according to any one of Configurations 1 to 6, wherein
a second weight concentration of the second organic substance in the first layer is greater than a first weight concentration of the first organic substance in the first layer.

Configuration 8
The scintillator according to Configuration 7, wherein
the second weight concentration is not less than 4 times the first weight concentration.

Configuration 9
The scintillator according to Configuration 7 or 8, wherein
the second weight concentration is not more than 10 times the first weight concentration.

Configuration 10
The scintillator according to any one of Configurations 1 to 9, wherein
a thickness of the first layer is not less than 200 μm and not more than 1,500 μm.

Configuration 11
The scintillator according to any one of Configurations 1 to 10, wherein
the second organic substance includes an aromatic compound, and
the aromatic compound includes the at least one.

Configuration 12
The scintillator according to any one of Configurations 1 to 11, wherein
the second organic substance includes bis[2-(diphenylphosphino)phenyl]ether oxide.

Configuration 13
The scintillator according to any one of Configurations 1 to 11, wherein
the second organic substance includes at least one selected from the group consisting of 1,3-bis(3-(diphenylphosphoryl)phenyl)benzene, 10-phenyl-10H,10'H-spiro[acridine-9,9'-anthracen]-10'-one, and 9,9'-(5-(phenylsulfonyl)-1,3-phenylene)-bis(9H-carbazole).

Configuration 14
The scintillator according to any one of Configurations 1 to 13, wherein
the first organic substance includes a benzene derivative including carbazole and a cyano group.

Configuration 15
The radiation detector according to any one of Configurations 1 to 14, wherein
the first organic substance includes at least one selected from the group consisting of:
2,4,5,6-tetra(9H-carbazole-9-yl)isophthalonitrile;

2,4,6-tris(4-(9,9-methylacridan-10-yl)phenyl)-1,3,5-triazine;

10-(4-(bis(2,3,5-tetramethylphenyl)boranyl)-2,3,5-tetramethylphenyl)-10H-phenoxazine;

2,4,6-tri(9H-carbazole-9-yl)-3,5-difluorobenzonitrile; and

9-[1,4]benzoxaborino[2,3,4-kl]phenoxaborin-7-yl-1,3,6,8-tetramethyl-9H-carbazole.

Configuration 16

The scintillator according to any one of Configurations 1 to 15, wherein
an absorption wavelength band of the second organic substance is not more than 380 nm.

Configuration 17

A radiation detector, comprising:
the scintillator according to any one of Configurations 1 to 16; and
a light detecting part configured to detect the light from the first layer.

Configuration 18

The radiation detector according to Configuration 17, wherein
the light detecting part includes:
a first conductive layer;
a second conductive layer located between the first layer and the first conductive layer; and
an organic semiconductor layer located between the first conductive layer and the second conductive layer.

Configuration 19

The radiation detector according to Configuration 17 or 18, wherein
a sensitivity of a first signal generated between the first conductive layer and the second conductive layer when the beta rays are incident on the first layer is greater than a sensitivity of a second signal generated between the first conductive layer and the second conductive layer when at least one of gamma rays, neutron rays, or X-rays are incident on the first layer.

Configuration 20

The radiation detector according to any one of Configurations 17 to 19, wherein
the organic semiconductor layer includes polythiophene and a fullerene derivative.

According to embodiments, a scintillator and a radiation detector can be provided in which the efficiency can be increased.

In the specification, "a state of electrically connected" includes a state in which multiple conductors physically contact and a current flows between the multiple conductors. "a state of electrically connected" includes a state in which another conductor is inserted between the multiple conductors and a current flows between the multiple conductors.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in scintillators such as first layers, organic substances, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all scintillators, and radiation detectors practicable by an appropriate design modification by one skilled in the art based on the scintillators, and the radiation detectors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A scintillator, comprising:
a first layer, wherein
the first layer includes
a first organic substance capable of emitting light, and
a second organic substance,
the second organic substance includes at least one selected from the group consisting of a carbonyl group, phosphine oxide, and a sulfinyl group,
the first layer emits light based on beta rays incident on the first layer,
a period from a time of a maximum value of an intensity of the light until the intensity of the light drops to 1/2.72 of the maximum value is not less than 10 ns, and
the first organic substance includes a thermally activated delayed fluorescence material.

2. The scintillator according to claim 1, wherein
the first layer further includes a third organic substance,
the third organic substance is a polymer, and
the third organic substance is located around the first and second organic substances.

3. The scintillator according to claim 2, wherein
a molecular weight of the second organic substance is less than a molecular weight of the third organic substance.

4. The scintillator according to claim 2, wherein
a molecular weight of the second organic substance is not less than 100 and not more than 1,000.

5. The scintillator according to claim 1, wherein
a concentration of the second organic substance in the first layer is not less than 10 wt % and not more than 50 wt %.

6. The scintillator according to claim 1, wherein
a thickness of the first layer is not less than 200 μm and not more than 1,500 μm.

7. The scintillator according to claim 1, wherein
the second organic substance includes an aromatic compound.

8. The scintillator according to claim 1, wherein
the second organic substance includes bis[2-(diphenylphosphino)phenyl]ether oxide.

9. The scintillator according to claim 1, wherein
the second organic substance includes at least one selected from the group consisting of 1,3-bis(3-(diphenylphosphoryl)phenyl)benzene, 10-phenyl-10H,10'H-spiro[acridine-9,9'-anthracen]-10'-one, and 9,9'-(5-(phenylsulfonyl)-1,3-phenylene)-bis(9H-carbazole).

10. The scintillator according to claim 1, wherein
the first organic substance includes at least one selected from the group consisting of:
2,4,5,6-tetra(9H-carbazole-9-yl)isophthalonitrile;
2,4,6-tris(4-(9,9-methylacridan-10-yl)phenyl)-1,3,5-triazine;
10-(4-(bis(2,3,5-tetramethylphenyl)boranyl)-2,3,5-tetramethylphenyl)-10H-phenoxazine;
2,4,6-tri(9H-carbazole-9-yl)-3,5-difluorobenzonitrile; and
9-[1,4]benzoxaborino[2,3,4-kl]phenoxaborin-7-yl-1,3,6,8-tetramethyl-9H-carbazole.

11. The scintillator according to claim 1, wherein
an absorption wavelength band of the second organic substance is not more than 380 nm.

12. A radiation detector, comprising:
the scintillator according to claim 1; and
a light detecting part configured to detect the light from the first layer.

13. The detector according to claim 12, wherein
the light detecting part includes:
a first conductive layer;
a second conductive layer located between the first layer and the first conductive layer; and
an organic semiconductor layer located between the first conductive layer and the second conductive layer.

14. The detector according to claim 13, wherein
a sensitivity of a first signal generated between the first conductive layer and the second conductive layer when the beta rays are incident on the first layer is greater than a sensitivity of a second signal generated between the first conductive layer and the second conductive layer when at least one of gamma rays, neutron rays, or X-rays are incident on the first layer.

15. The detector according to claim 13, wherein
the organic semiconductor layer includes polythiophene and a fullerene derivative.

16. A scintillator, comprising:
a first layer, wherein
the first layer includes
a first organic substance capable of emitting light, and
a second organic substance,
the second organic substance includes at least one selected from the group consisting of a carbonyl group, phosphine oxide, and a sulfinyl group,
the first layer emits light based on beta rays incident on the first layer,
a period from a time of a maximum value of an intensity of the light until the intensity of the light drops to 1/2.72 of the maximum value is not less than 10 ns, and
a second weight concentration of the second organic substance in the first layer is greater than a first weight concentration of the first organic substance in the first layer.

17. The scintillator according to claim 16, wherein
the second weight concentration is not less than 4 times the first weight concentration.

18. The scintillator according to claim 16, wherein
the second weight concentration is not more than 10 times the first weight concentration.

19. A scintillator, comprising:
a first layer, wherein
the first layer includes
a first organic substance capable of emitting light, and
a second organic substance,
the second organic substance includes at least one selected from the group consisting of a carbonyl group, phosphine oxide, and a sulfinyl group,
the first layer emits light based on beta rays incident on the first layer,
a period from a time of a maximum value of an intensity of the light until the intensity of the light drops to 1/2.72 of the maximum value is not less than 10 ns, and
the first organic substance includes a benzene derivative including carbazole and a cyano group.

\* \* \* \* \*